United States Patent Office 3,595,759
Patented July 27, 1971

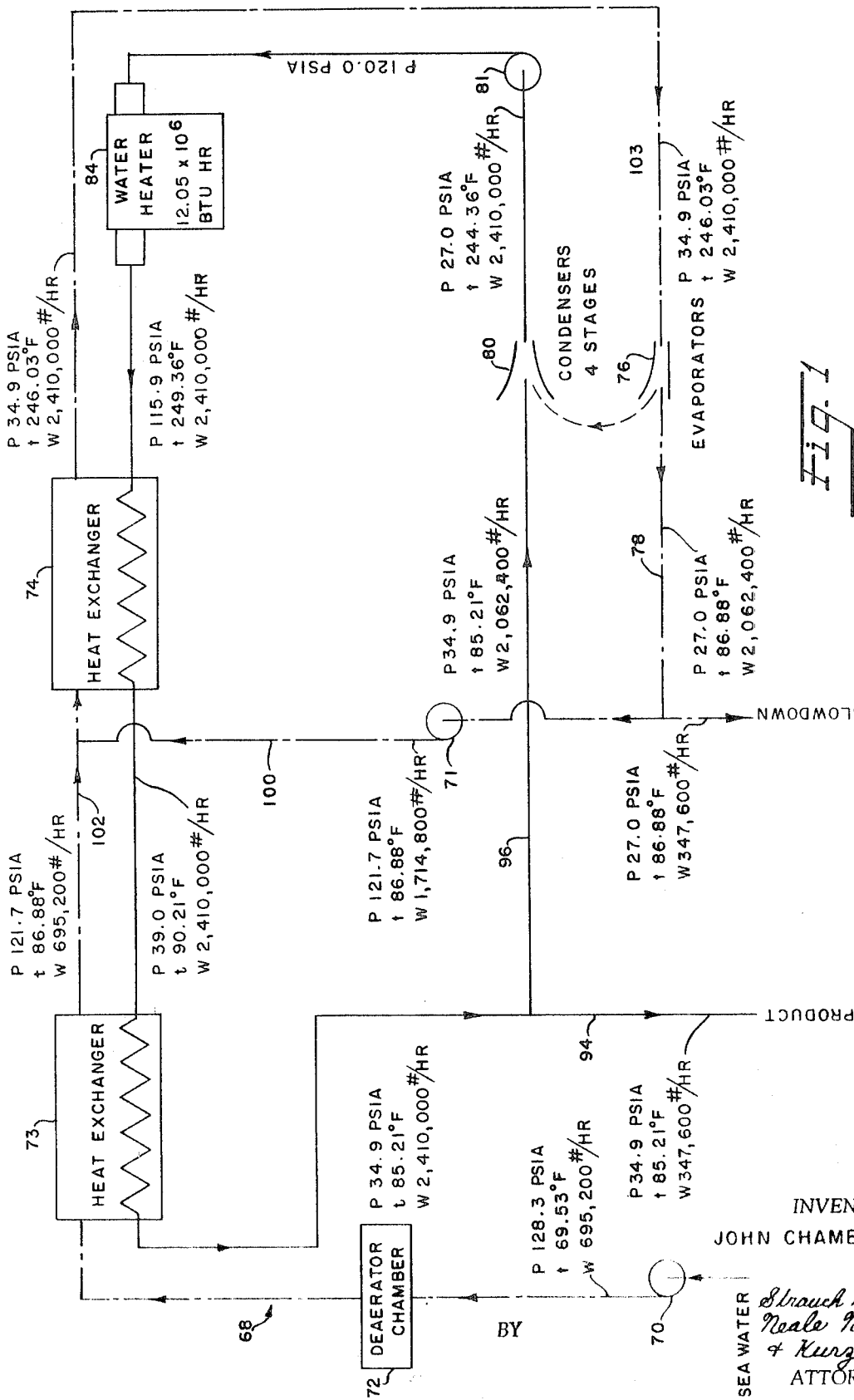

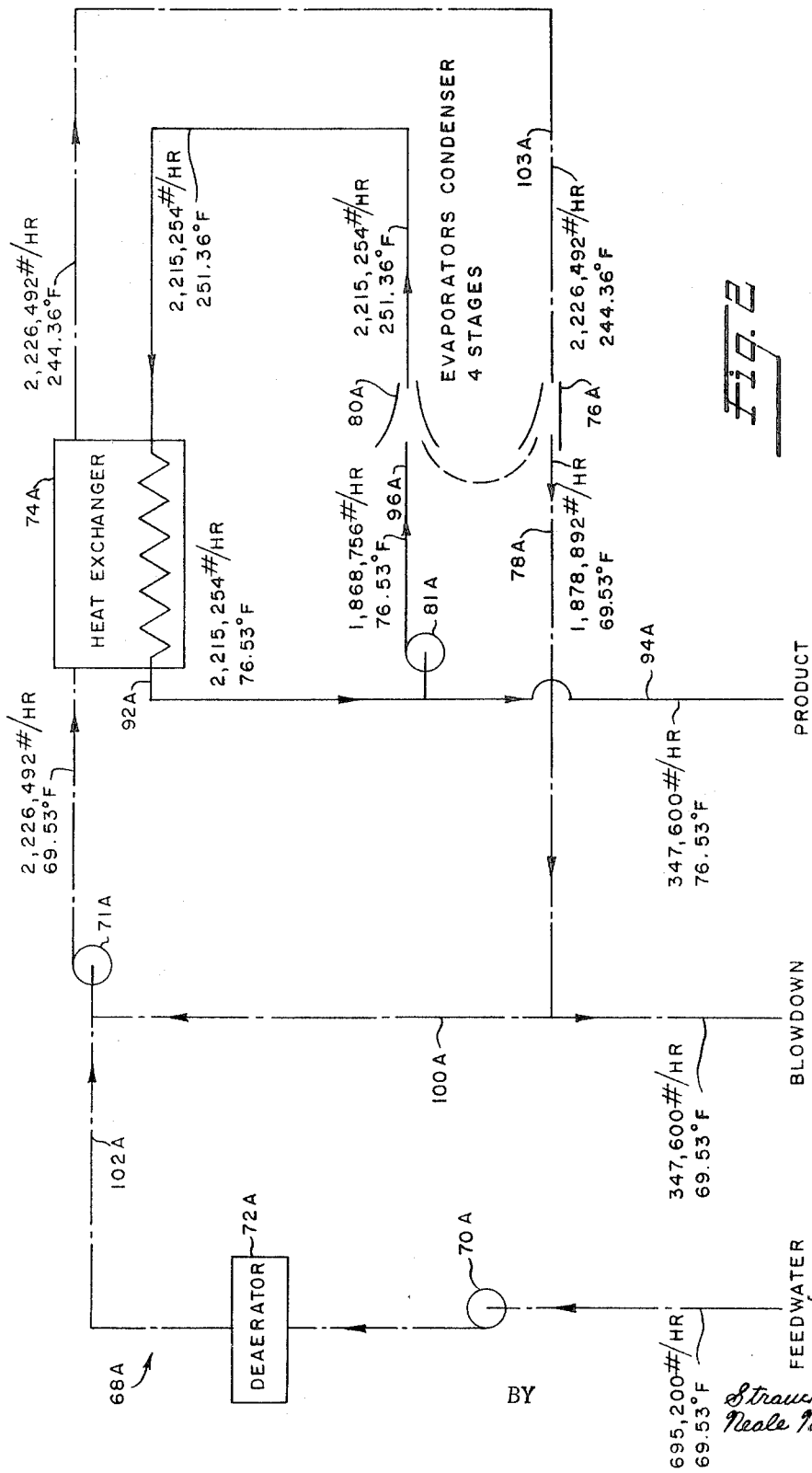

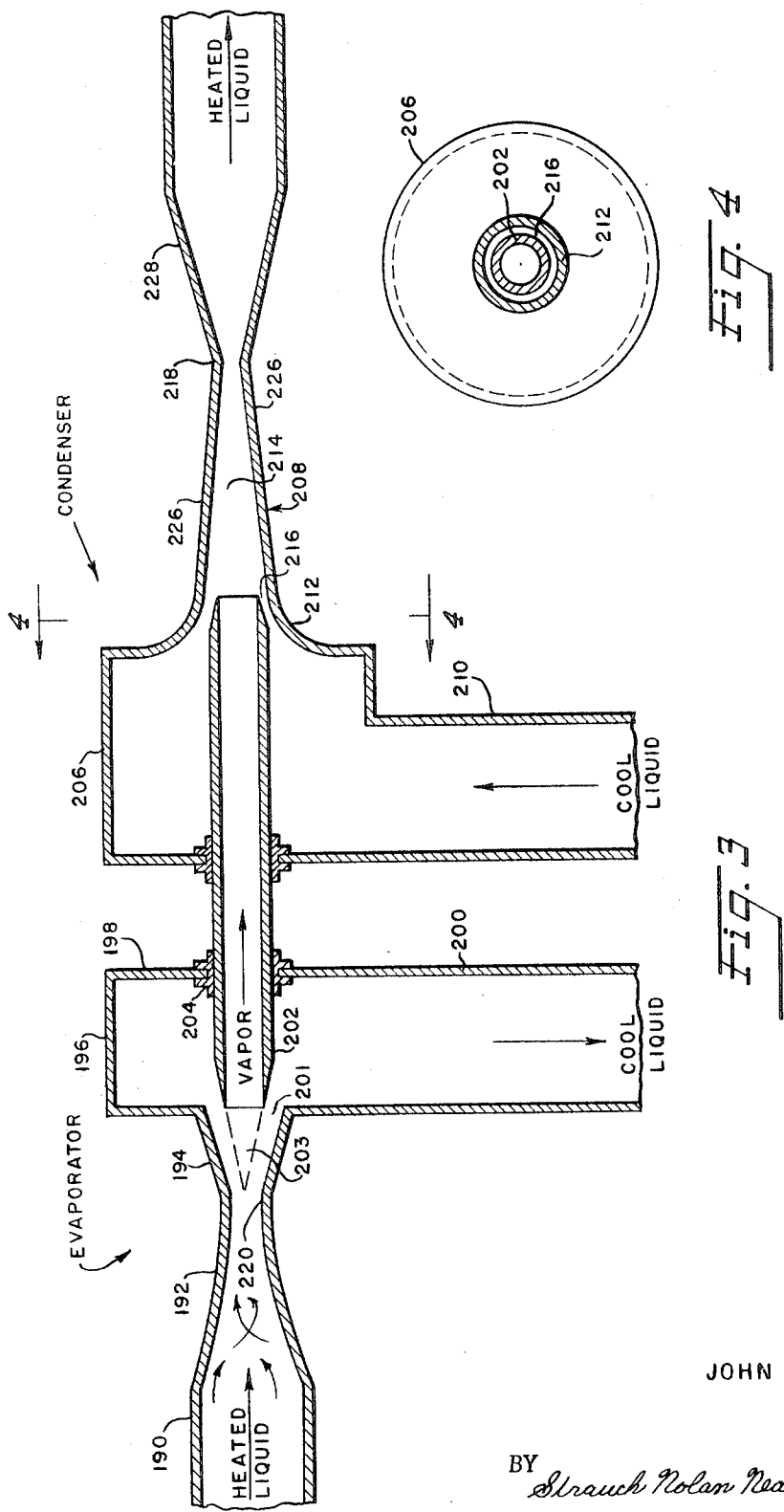

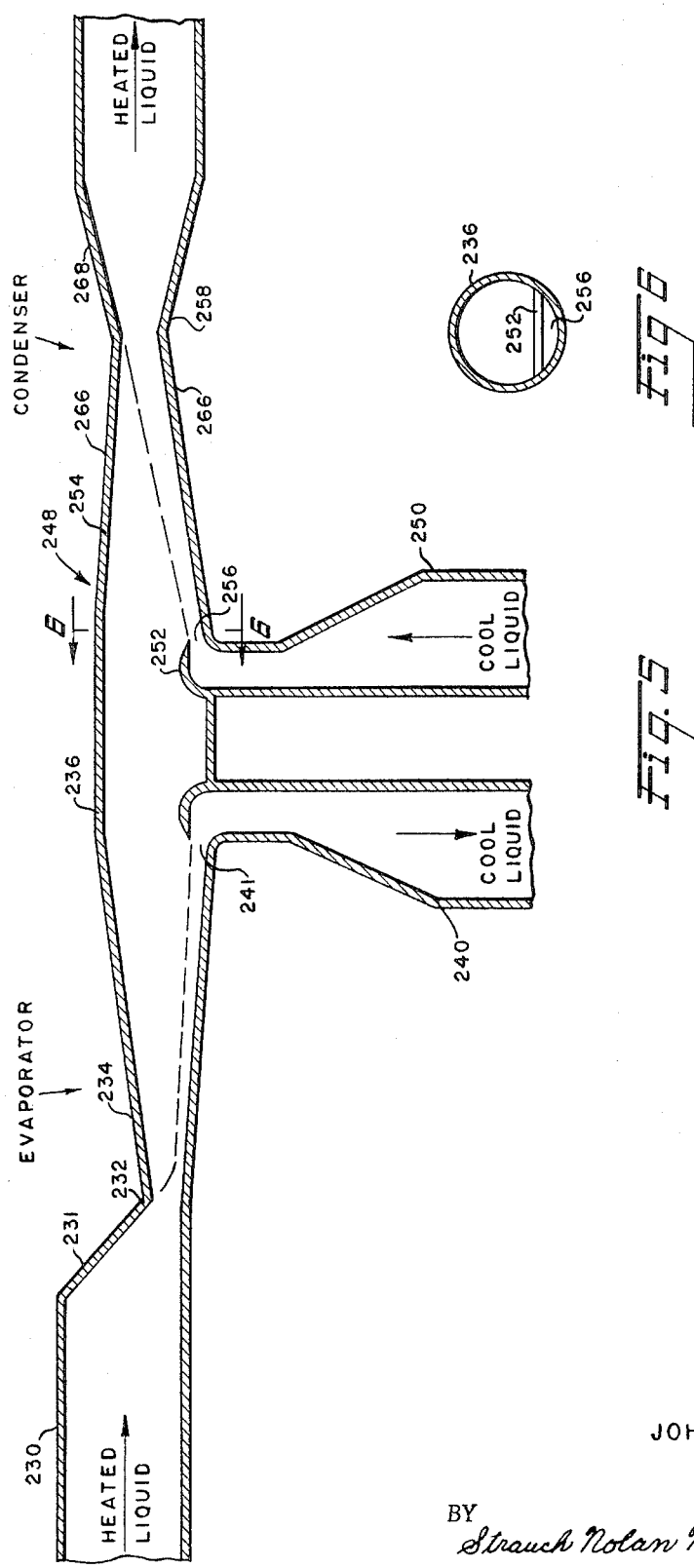

3,595,759
DISTILLATION METHODS AND APPARATUS
John Chambers, Rte. 1, Box M41,
Del Mar. Calif. 92014
Continuation-in-part of application Ser. No. 528,431,
Feb. 18, 1966. This application June 11, 1969,
Ser. No. 832,226
Int. Cl. B01d 3/00; F28b 1/00
U.S. Cl. 202—185                                    11 Claims

ABSTRACT OF THE DISCLOSURE

A liquid is distilled by passing it through an evaporator in which it is vaporized by forced convection surface evaporation. The resulting vapor is then passed at a high velocity into a condenser wherein it directly contacts a fluid and condenses therein, with both the vapor and fluid losing velocity which produces an increases in the static pressure. The compression and condensation of the vapor in the liquid approaches an isentropic process.

CROSS REFERENCE TO RELATED APPLICATIONS

This application is a continuation-in-part of application No. 528,431, filed Feb. 18, 1966, now abandoned.

BACKGROUND OF THE INVENTION

This invention relates to apparatus for and methods of distilling liquids and, more specifically, to methods and apparatus for distilling liquids more efficiently and less expensively than has heretofore been possible. The methods and apparatus disclosed herein may be employed to convert saline to fresh water; and the principles of the present invention will be developed primarily by relating them to this application of the invention. This description of an exemplary application is, however, to be understood as merely illustrative and not definitive of the scope of the present invention, which is intended to be limited only by the appended claims.

Typical previously known distillation systems, such as that shown in U.S. Pat. No. 2,388,328 to Jacocks, have an essentially throttle type mode of operation, which is relatively inefficient; and, consequently, they are expensive to operate.

SUMMARY OF THE INVENTION

I have now discovered a novel, improved, continuous distillation process capable of much higher efficiencies than those of the type described above. In this novel process, the liquid to be distilled is vaporized in a continuous manner by forced convection surface evaporation. The evaporation is started by reduction of the liquid static pressure in the direction of flow below that of the vapor pressure of one or more fractions thereof. The surface evaporation is started by the substantially simultaneous reduction of the liquid static pressure in the transverse direction of flow. The surface evaporation is continued after it is started by keeping the liquid turbulent and by controlling the rate of evaporation from the liquid surface in relation to the turbulency and thickness of the body of liquid flowing through the evaporation. At the end of the evaporation cycle the vapor, now flowing at high velocity in relationship to the velocity of the water has a pronounced velocity profile. The liquid water at this point is stripped off and the vapor is directed to a passage where a vapor condensing liquid flows in direct communication with the vapor. In this passage the fluid and the vapor lose velocity. The loss of velocity causes an increase in the static pressure of the fluid and the vapor, and thereby, increases the temperature of the vapor stream. The increase in the pressure of the vapor causes the vapor to condense in the fluid. Due to the pronounced varying velocity profile of the vapor, the compression and condensation of the vapor into the liquid approaches an isentropic process.

As indicated above, one important advantage of the system just described is that it is more efficient than previously known distillation systems, and therefore, less expensive to operate. At the same time initial investment costs are comparable to or even lower than those of conventional systems. A further important advatnage of this system is that it is much more versatile and can be employed in a wider variety of processes than prior are distillation systems.

From the foregoing it will be apparent that one important primary object of the present invention is the provision of distillation systems and processes which are more efficient and more economical than those heretofore known.

Another primary object of the present invention is the provision of distillation systems and processes which are more versatile than those heretofore known.

In conjunction with the preceding object, another important object of this invention resides in the provision of distillation systems and processes capable of distilling a single liquid and of distilling and separating one or more liquids from a mixture of liquids and, if more than one liquid is distilled, of separating the liquids so distilled.

Another important object of the present invention is the provision of novel systems and processes for heating liquids and mixtures of liquids with heat recovered from vapors or mixtures of vapors distilled from the same or a different liquid or mixture of liquids.

Another important object of the present invention is the provision of novel systems and processes for heating liquids and mixtures of liquids with heat recovered from vapors or mixtures of vapors distilled from the same or a different liquid or mixtures of liquids and to perform work on the condensing vapors or mixtures of vapors by the liquids or mixtures of liquids in order to produce a heat pump effect.

Another important object of the present invention is the provision of novel systems and processes for obtaining a pronounced velocity profile of the vapor at evaporator exit and condenser entry in order to approach an isentropic compression process in the condenser.

Another specific object of this invention is to provide distillation systems including means for supplying a liquid under pressure, an evaporator for vaporizing a portion of the flowing liquid by increasing its velocity by an amount sufficient to reduce its static pressure below its vapor pressure, and a condenser for reducing the vapor to the liquid state.

Other objects, additional features, and further important advantages of the invention will become apparent from the appended claims and from the ensuing detailed description and discussion taken in conjunction with the attached drawing, wherein:

BRIEF DESCRIPTION OF THE DRAWINGS

FIG. 1 is a diagrammatic illustration of a distillation system constructed in accord with the principles of this invention, and any energy balance therefore, employing fresh and saline water as the primary and secondary fluids, respectively. In this system the necessary terminal temperature difference over the tube and shell heat exchangers is obtained through the addition of a sensible heat supplied by the water heater.

FIG. 2 is a diagrammatic illustration of a distillation system constructed in accord with the principles of this invention, and an energy balance therefor, employing fresh and saline water as the primary and secondary fluids, respectively. In this system the necessary terminal temperature difference over the tube and shell heat exchanger is obtained through a heat pump effect. The necessary fluid pumping energy to produce the heat pump effect is supplied by a pump supplying fluid under pressure to the condensers or the evaporators.

FIG. 3 is a longitudinal section through an evaporator-condenser arrangement which may be used in the system of FIGS. 1 and 2.

FIG. 4 is a transverse section through the condenser-evaporator of FIG. 3, taken substantially along line 4—4 of the latter figure.

FIG. 5 is a longitudinal section through an evaporator-condenser arrangement which may be used in the distillation system of FIGS. 1 and 2.

FIG. 6 is a transverse view through the condenser-evaporator of FIG. 5, taken substantially along line 6—6 of the latter figure.

DETAILED DESCRIPTION OF THE INVENTION

Referring now to the drawing, FIG. 1 illustrates in schematic form an exemplary distillation system 68, constructed in accord with principles of the present invention, for the conversion of saline water to fresh water. The numerical values in FIG. 1 are for a one million gallon per day plant.

In the system 68 illustration in FIG. 1, sea water is pumped by a pump 70 through a conventional deaerator chamber 72. The incoming sea water after passing through the deaerator 72 and a conventional shell and tube heat exchanger 73, where its temperature is raised from, in the illustrated example, approximately 70° F. to approximately 87° F., joins the recirculating sea water from conduit 100 and both flows flow through the conventional shell and tube heat exchanger 74, where its temperature is raised from, in the illustrated example, approximately 87° F. to approximately 246° F.

From heat exchanger 74, the heated sea water flows into the evaporators 76. In each evaporator part, the sea water is evaporated and the steam separated from the unevaporated portion of the liquid. After passing through the four evaporators in series, the unevaporated portion of the liquid is discharged into conduit 78. The steam produced in the evaporators 76 flows into its respective condenser. The condensers 80 condense and entrain the steam condensate in a stream of fresh water, drawn through conduit 96 and the condensers by pump 81, thereby raising the temperature of the primary fluid from approximately 85° F. to 244° F.

To maintain a balance between the heat removed from system 68, approximately 12,000,000 B.t.u.'s per hour has to be added to the system 68 through heater 84. This sensible heat is added to the fresh water from the condensers 80 and pump 81 raising its temperature from approximately 244° F. to approximately 249° F. The addition of this sensible heat, in addition to replacing the heat rejected from system 68, provides the necessary terminal temperature difference over the heat exchangers 74 and 73 to allow for the fresh water to release its sensible heat to the salt water.

From heater 84, the 249.36° F. fresh water flows through heat exchanger 74 where heat is given up to the incoming recirculated saline water, as discussed previously.

From the heat exchanger 74, the fresh water, now reduced to a temperature of approximately 90° F., flows through a second heat exchanger 73 where heat is given up to the incoming saline water, as discussed previously.

From heat exchanger 73 the fresh water, now reduced to a temperature of approximately 85° F., flows through conduits 94 and 96. Branch conduit 94 taps off approximately 348,000 pounds per hour of fresh water.

The remaining fresh water (approximately 2,000,000 pounds per hour) is recirculated through and provides the primary drive fluid for condenser 80.

To minimize heat losses, the bulk of the unevaporated saline water discharged from evaporators 76 into conduit 78 is recirculated through conduit 100 into the supply conduit 102 connected between heat exchanger 73 and 74. To prevent the saline water supply to the evaporator from becoming unduly concentrated, however, approximately 348,000 pounds per hour of the concentrated saline water discharged from the evaporator are blown down from the system.

Outside of the relatively small amounts of energy consumed by pumps 70, 71 and 81 in maintaining circulation, the only energy added to the system 68 is the approximately 12,000 B.t.u.'s per hour added by the water heater 84.

Although four stages of evaporators 76 and condensers 80 are indicated in FIG. 1, a greater or smaller number of stages may be used for differing design conditions.

Referring now to the drawing, FIG. 2 illustrates in schematic form an exemplary distillation system 68A, constructed in accord with principles of the present invention, for the conversion of saline to fresh water. The numerical values in FIG. 2 are for a one million gallons per day plant.

In the system illustrated in FIG. 2, sea water is pumped by a pump 70A through a conventional deaerator chamber 72A. The incoming sea water after passing through the deaerator conduit 102A joins the recirculating sea water from conduit 100A and is pumped by pump 71A through a conventional heat exchanger 74A, where its temperature is raised from, in the illustrated example, approximately 70° F. to approximately 244° F.

From heat exchanger 74A, the heated sea water flows through conduit 103A into evaporators 76A. In each evaporator part, the sea water is evaporated and the steam separated from the unevaporated portion of the liquid. After passing through four evaporators in series, the unevaporated portion of the liquid is discharged into conduit 78A. The steam produced in the evaporators 76A flows into its respective condenser 80A. The evaporator-condenser combination 76A and 80A have an associated heat pump effect produced by the expansion of the liquid in the condensers 80A or by increasing the velocity of the water and thereby the velocity of the vapor in the evaporators 76A or by a combination of these heat pump effect producing methods. The work to accomplish the heat pump effect is produced by pump 71A or 81A or a combination of pumps 71A and 81A. After the steam is compressed in the condensers 80A, the steam is condensed and entrained in the stream of fresh water pumped through conduit 96A and the condenser by pump 81A, raising the temperature of the primary fluid from approximately 77° F. to approximately 251° F.

From the condensers 80A, the approximate 251° F. fresh water flows through heat exchanger 74A, where heat is given up to the incoming saline water, as discussed previously.

From the heat exchanger 74A, the fresh water, now reduced to a temperature of approximately 77° F., flows through conduits 94A and 96A. Branch conduit 94A taps off approximately 348,000 pounds per hour of fresh water. The remaining fresh water (approximately 1,900,000 pounds per hour) is recirculated through branch conduit 96A and provides the primary drive fluid for the condensers 80A.

To minimize heat losses, the bulk of the unevaporated saline water discharged from the evaporators 76A into conduit 78A is recirculated through conduit 100A into the supply conduit 102A. To prevent the saline water supply to the evaporators 76A from becoming unduly concentrated, however, approximately 348,000 pounds per hour of the concentrated saline water discharged from the evaporator are blown down from the system.

Outside of the relatively small amounts of energy consumed by pumps 70A, 71A, and 81A in maintaining circulation, the only energy added to the system 68A after starting is 776,000,000 foot pounds per hour added by pumps 71A and 81A. The pumping energy of 776,000,000 foot pounds per hour is equivalent to approximately 997,000 Btu's per hour.

Although four stages of evaporators 76A and condensers 80A are indicated in FIG. 2, a greater or smaller number of stages may be used for differing design conditions.

In other words, approximately 348,000 pounds of water are produced by approximately 12,000,000 Btu's in distillation system 68 and approximately 348,000 pounds of water are produced by approximately 776,000,000 foot pounds of work or an equivalent heat energy of approximately 997,000 B.t.u.'s in distillation system 68A. For example, the approximate cost of saline water conversion in a one million gallon per day plant of the heretofore proposed multiple stage flash type including fuel, electricity, and amortization of plant investment is 78.9 cents per 1000 gallons. In system 68A of the type described above, this figure is 19.22 cents per 1000 gallons. Consequently, even allowing for wide margins of error in the cost figure, it can be seen that the conversion system of the present invention is much more efficient than anything heretofore known.

With the exception of evaporators 76 and 76A, condensers 80 and 80A, all of the components of distillation systems 68 and 68A may be of conventional commercially available construction. Further description of such components is therefore, not considered necessary. Evaporators 76 and 76A are disclosed in detail in my copending application Ser. No. 528,520 and application Ser. No. 683,666, now Pat. 3,509,932.

Evaporator-condenser combinations which may be used in the distillation system of FIG. 1 and FIG. 2, are shown in FIG. 3 and 5. The condensers of these evaporator-condenser combinations effect condensation in an efficient manner due to the vapor velocity profile produced by the evaporators. This vapor profile produced in the evaporators allow the condensers to fulfill the thermodynamic equations of state for a process approaching an isentropic compression.

One evaporator-condenser which may be used in the distillation system of FIG. 1 and 2 is shown in FIG. 3. In this embodiment, the secondary fluid flows through a cylindrical conduit 190, which terminates in a converging section 192 and a diverging nozzle 194 connected to a second cylindrical conduit 196 to which a transverse end wall 198 and a liquid outlet conduit 200 are fitted. Conduit 196 surrounds a tubular vapor conduit 202 which extends from the outlet of nozzle 194 through an annular resilient seal 204 mounted in an opening in end wall 198 substantially into the throat of nozzle 212 at the end of a third cylindrical conduit 206 incorporated in a condenser 208.

Conduit 206, supplied with drive fluid from a primary condensing liquid conveying conduit 210, terminates in a nozzle 212 which discharges into a condensing chamber 214 to conduit 228. The condensing chamber 214 is shown with convergent walls 226. However, the walls may be constructed divergent as well as parallel. The exit ends of nozzle 212 and vapor conduit 202 lie in substantially the same plane.

In this embodiment of the invention, secondary liquid entering conduit 190 is spiralling or rotating, the rotation of the secondary liquid having been initiated by stationary twisted vanes or by entry into conduit 190 through a tangential inlet. The secondary liquid spirals through the gradually converging inlet 192 to the throat 220 of the evaporator.

The liquid spiralling produces a force on the water which varies the static pressure of the water in a direction normal to the axis of the evaporator. Because of the spiralling force, the static pressure of the water is lowest in the center or on the axis of the evaporator.

Since the velocity of the water is increased due to the gradual convergence of the inlet section 192 as it flows therethrough, the static pressure of the water is also decreased in the direction of the axis of the evaporator. At the throat 220 of the evaporator, the static pressure of the water is low enough to cause surface evaporation. This starts in the center of the liquid at approximately evaporator throat 220, since this is the point of lowest static pressure due to the spiralling force on the swirling water.

After the surface evaporation is started at throat 220, it continues throughout the divergent section 194 of the evaporator. The vapor from the surface evaporation forms a central core 203 which has the apperance of a cone surrounded by the unevaporated liquid. After the proper expansion is realized, the vapor and liquid are separated with the vapor flowing into a take-off 202, which has an inlet approximately equal in diameter to the diameter of the vapor cone 203 at the upstream end of the take-off. The vapor flows into and through vapor conduit 202 at a high velocity to condenser 208. The liquid exits through annular opening 201 into conduit 200 at a low velocity.

Liquid for condensing the vapor is pumped or otherwise delivered under pressure to conduit 206 through conduit 210. The liquid then flows through nozzle 212 and annular discharge opening 216 and against condensing chamber wall 226. As the vapor flows toward condensing chamber outlet 218, it is compressed and condensed by the surrounding liquid. This process approaches an isentropic compression. The condensation process heats the condensing liquid to a temperature approximately equal to the initial temperature of the liquid to be vaporized and above the temperature of entering condensing liquid and vapor. The mixture of heated primary liquid and condensate then flows from condensing chamber 214 through the divergent exit section 228. The condenser 208 is shown with convergent walls 226. However, the walls may be constructed divergent as well as parallel.

An evaporator-condenser which may be used in the distillation system of FIGS. 1 and 2 is shown in FIG. 5. In this embodiment, the secondary liquid flows through a cylindrical conduit 230 into an offset convergent section 231, which terminates in a neck or sharp juncture 232, and a divergent nozzle 234 connected to a cylindrical conduit 236. Piercing the sides of conduit 236 is a concentrated liquid take-off opening 241 and a condensing liquid supply opening 256. Conduit 236 which extends from the outlet of nozzle 234 past the liquid take-off opening 241 forms the entry of the condenser in conjunction with the liquid supply opening 256.

Conduit 250 supplied with drive liquid from a condensing liquid source, terminates in nozzle 252 which discharges into a condensing chamber 254 to conduit 268. The exit ends of condensing liquid nozzle 252 and vapor conduit 236 lie substantially as shown in FIG. 6. The condensing chamber 254 is shown with convergent walls 266. However, the walls may be constructed divergent as well as parallel.

In this embodiment of the invention, evaporatable secondary liquid entering conduit 230 passes through the converging section 231, thereby increasing its velocity and reducing its static pressure, and through the sharp juncture 232. A vena contracta is formed after the liquid passes the sharp juncture 232 which further increases the liquid velocity and lowers its static pressure to the vapor pressure of the liquid. The vena contracta also varies the static pressure of the liquid in a plane normal to the axis of the evaporator. The vena contracta starts surface evaporation.

After the surface evaporation is started, it continues throughout the divergent section 234 of the evaporator. After the proper expansion is realized, the vapor and liquid are separated with the vapor flowing through conduit 236 and the concentrated liquid diverted through the liquid take-off opening 241 and flowing into conduit 240. The vapor enters the condenser 248 through conduit 236.

Liquid for condensing the vapor is pumped or otherwise delivered under pressure to nozzle 252 from conduit 250. The liquid then flows through nozzle opening 256 against condensing chamber wall 266. As the vapor flows toward the condensing chamber outlet 258, it is substantially isentropically compressed and condensed by the condensing primary liquid with both the vapor and primary liquid losing velocity and experiencing a rise in static pressure. This process approaches a two-phase isentropic compression. The mixture of heated primary liquid and condensate then flows from condensing chamber 254 through the divergent exit section 268. The condenser 248 is shown with convergent walls 266. However, the walls may be constructed divergent as well as parallel. The evaporator-condenser of FIG. 5 is shown cylindrical in cross-section. The cross-section of the evaporator-condenser may be constructed in other shapes such as rectangular.

From the foregoing descriptions and detailed discussion of exemplary embodiments of the present invention, it will be apparent to those skilled in the arts to which this invention pertains that many modifications may be made in the illustrated and described structures and that the principles of the present invention are adaptable to a wide variety of applications. Consequently, to the extent that such modifications and applications are not expressly excluded from the appended claims, they are fully intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A dynamic fluid distillation process, comprising the steps of:
    (a) effecting a continuous flow of the liquid to be distilled along a predetermined path, said liquid flowing as a coherent body with a free liquid surface;
    (b) continuously reducing the pressure on the liquid surface as it flows along said path to cause evaporation from the surface of the liquid as the liquid flows along said path, whereby there is a continuous vapor-liquid interface extending along said path with the liquid on one side of said interface and the released vapor on the other side thereof;
    (c) accelerating the vapor from the time it is evaporated until it reaches the end of said path so that, at the end of the path, the body of vaporized liquid will have a pronounced varying velocity profile with the initially vaporized liquid moving at the highest velocity and the vapor vaporized last moving at the lowest velocity, whereby said expansion may be accomplished substantially isentropically;
    (d) separating the unevaporated liquid from the vapor at the end of said path after the expansion step is completed; and
    (e) substantially isentropically compressing said vapor by contacting the body of vapor having a varying velocity profile with a second coherent body of condensing liquid having a free surface to thereby reduce the velocity of and condense said vapor, said second liquid being introduced into contact with said body of vapor by causing said vapor to flow through a channel and introducing said liquid and said vapor into said channel at the upstream end thereof;
    (f) whereby said evaporation and condensation are accomplished substantially reversibly and therefore with a minimum energy loss.

2. The process of claim 1, together with the step of mechanically accelerating the liquid to be distilled to produce a heat pump effect, whereby the temperature of the condensed liquid can be raised to a higher level than the temperature of the liquid to be distilled.

3. The process of claim 1, together with the step of mechanically performing work on the condensing liquid with which the body of vapor is contacted to produce a heat pump effect, whereby the temperature of condensed and condensing liquid can be raised to a higher level than the temperature of the liquid to be distilled producing the vapor condensed.

4. A fluid distillation system comprising:
    (a) a first conduit means and means for effecting a continuous flow of liquid to be distilled as a coherent body with a free surface through said first conduit means and a continuous reduction of the pressure on the liquid as it flows through said conduit means to cause evaporation from the surface as it flows herethrugh, whereby there s a continuous vapor-liquid interface in said conduit means with the liquid on one side of said interface and the vapor on the other side thereof, said conduit means being proportioned for accelerating the vapor from the time it is evaporated until it reaches the end of said first conduit means, so that, at the end of the said first conduit means, the body of vaporized liquid will have a pronounced varying velocity profile with the initially vaporized liquid moving at the highest velocity and the vapor vaporized last moving at the lowest velocity, whereby said expansion is accomplished substantially isentropically;
    (b) off-take means at the discharge end of said first conduit means for separating the unevaporated liquid from the vapor; and
    (c) means for substantially isentropically compressing the vaporized liquid comprising a second conduit means communicating at its upstream end with the downstream end of the first conduit means, whereby the vaporized liquid flows from said first conduit means into the second conduit means at its upstream end and means for introducing a second coherent body of condensing liquid having a free surface into said second conduit means at the upstream end thereof;
    (d) whereby said evaporation and condensation are accomplished substantially reversibly and therefore with minimum energy loss.

5. The distillation system as defined in claim 4, wherein the means for compressing the separated vapor is means providing a continuously converging conduit in fluid communication with the means provided for separating said liquid and vapor.

6. The distillation system as defined in claim 4, wherein the conduit means of the means for compressing and condensing said vapor comprises:
    (a) a conduit for the condensing liquid terminating in a nozzle;
    (b) a vapor conduit extending to said nozzle and terminating at the exit end thereof; and
    (c) a convergent condensing chamber communicating with the nozzle and vapor conduit.

7. The system of claim 4, together with means for mechanically accelerating the liquid to be distilled to produce a heat pump effect, whereby the temperature of the condensed and condensing liquid can be raised to a higher level than the temperature of the liquid to be distilled producing the vapor condensed.

8. The system of claim 4, together with means for mechanically performing work on the condensing liquid with which the body of vaporized liquid is contacted, to produce a heat pump effect, whereby the temperature of the condensed and condensing liquid can be raised to a higher level than the temperature of the liquid to be distilled.

9. A fluid dynamic distillation system comprising:
(A) a forced convection surface evaporator including
  (a) a first conduit means for receiving heated liquid;
  (b) means providing a flow restriction at the downstream end of said first conduit means, said flow restriction causing a reduction of the pressure of the heated liquid both in the direction of the flow and in a direction transverse thereto;
  (c) means providing a divergent section bounding a space of increasing cross-section in the downstream direction, said divergent section being immediately downstream from said flow restriction, said divergent section defining the vaporization space for said heated liquid;
  (d) a second conduit means extending generally in the direction of flow from the downstream end of said divergent section;
  (e) a third conduit means having an inlet spaced downstream from said flow restriction and having an inlet communicating with the vaporizing space bounded by said divergent section at the downstream end of said section;
  (f) means for effecting a flow of heated liquid through said first conduit means and then through said flow restriction and into said divergent section and toward the inlet to said third conduit means to thereby develop a reduction of the pressure of the liquid both in the direction of flow and in a direction transverse thereto as it passes through said flow restriction and a consequent vaporization of the heated liquid in the space bounded by said divergent section and a flow of the vapor into the inlet of and through the third conduit means for removal from said space;
  (g) the inlet to said second conduit means being at the downstream end of said divergent section and adjacent and communicating with the vaporization space; whereby unvaporized liquid is caused by said flow effecting means to flow into the inlet of and through said second conduit means to effect a removal of unvaporized liquid from said evaporator; and
(B) means communicating with said third conduit means for compressing said vapor and condensing said vapor by directing said vapor into a stream of condensing fluid.

10. The distillation system as defined in claim 9, wherein the means for compressing the separated vapor includes a continuously converging fluid passage, and means for introducing condensing fluid into said converging fluid passage.

11. The distillation system as defined in claim 9, wherein the means for compressing and condensing said vapor comprises a conduit for the condensing fluid terminating in a nozzle, a vapor conduit connected to said third conduit means for extending to said nozzle and terminating adjacent the exit end thereof, and a convergent condensing chamber communicating with the nozzle and vapor conduit.

References Cited

UNITED STATES PATENTS

| | | | |
|---|---|---|---|
| 393,488 | 11/1888 | Schutte | 261—76 |
| 585,365 | 6/1897 | Skiffington | 165—108 |
| 771,986 | 10/1904 | Kniffler | 165—108 |
| 1,547,893 | 7/1925 | Bergius | 203—41 |
| 1,803,054 | 4/1931 | Broido | 60—94 |
| 3,214,685 | 10/1965 | Wells | 203—11X |
| 3,288,685 | 11/1966 | Kemper et al. | 203—11 |
| 3,298,932 | 1/1967 | Bauer | 203—11 |
| 3,385,768 | 5/1968 | Yost | 202—186 |
| 3,442,769 | 5/1969 | Heinz | 203—7 |
| 3,509,932 | 5/1970 | Chambers | 159—6 |

FOREIGN PATENTS

| | | | |
|---|---|---|---|
| 380,419 | 12/1907 | France | 230—92 |
| 1,155,755 | 5/1958 | France | 165—108 |

NORMAN YUDKOFF, Primary Examiner

J. SOFER, Assistant Examiner

U.S. Cl. X.R.

165—110; 203—11; 417—164

UNITED STATES PATENT OFFICE
CERTIFICATE OF CORRECTION

Patent No. 3,595,759          Dated July 27, 1971

Inventor(s) J. Chambers

It is certified that error appears in the above-identified patent and that said Letters Patent are hereby corrected as shown below:

Col. 1, line 18, "increases" should be --increase--.

Col. 2, line 12, "are" should be --art--.

Claim 4, Col. 8, line 19, after "surface" should be inserted --of the liquid--.

Claim 4, Col. 8, line 20, "herethrough" should be --therethrough--; "s" should be --is--.

In references cited the Wells patent number should be 3,214,352 instead of 3,214,685.

Signed and sealed this 7th dayof March 1972.

(SEAL)
Attest:

EDWARD M.FLETCHER,JR.          ROBERT GOTTSCHALK
Attesting Officer          Commissioner of Patents